United States Patent
Hashizume et al.

(10) Patent No.: US 10,104,262 B2
(45) Date of Patent: Oct. 16, 2018

(54) SCANNER TURNING ON LIGHT SOURCE DURING CLOSING PRESSURE PLATE AND SHEET SIZE DETECTION METHOD BY SCANNER

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventors: Yusuke Hashizume, Urayasu Chiba (JP); Naoyuki Misaka, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/466,069

(22) Filed: Mar. 22, 2017

(65) Prior Publication Data

US 2018/0234574 A1    Aug. 16, 2018

(30) Foreign Application Priority Data

Feb. 10, 2017  (JP) .................. 2017-022729

(51) Int. Cl.
| | |
|---|---|
| H04N 1/04 | (2006.01) |
| H04N 1/028 | (2006.01) |
| H04N 1/10 | (2006.01) |
| H04N 1/00 | (2006.01) |
| H04N 1/12 | (2006.01) |

(52) U.S. Cl.
CPC ..... *H04N 1/02815* (2013.01); *H04N 1/00708* (2013.01); *H04N 1/1061* (2013.01); *H04N 1/121* (2013.01)

(58) Field of Classification Search
CPC .......... H04N 1/02815; H04N 1/1061; H04N 1/00708; H04N 1/121
USPC .................................. 358/475, 474
See application file for complete search history.

(56) References Cited

U.S. PATENT DOCUMENTS

| | | | | |
|---|---|---|---|---|
| 8,786,916 | B2 * | 7/2014 | Nakazawa | H05B 33/0845 348/222.1 |
| 2010/0214573 | A1 * | 8/2010 | Oosaki | H04N 1/00652 358/1.2 |
| 2017/0019547 | A1 * | 1/2017 | Ozaki | H04N 1/00708 |

FOREIGN PATENT DOCUMENTS

| | | | |
|---|---|---|---|
| JP | 1996-069215 | * 3/1996 | ............... H04N 1/00 |
| JP | 2012-178652 | 9/2012 | |
| JP | 5230382 | 3/2013 | |
| JP | 5316260 | 7/2013 | |

* cited by examiner

*Primary Examiner* — Houshang Safaipour
(74) *Attorney, Agent, or Firm* — Amin, Turocy & Watson LLP (57) ABSTRACT

In general, according to one embodiment, a scanner includes an original document stand, a pressure plate, a carriage, an image sensor, an amplification unit, and a processor. The processor turns on the light source during closing the pressure plate, detects a sheet size in a second direction perpendicular to the first direction, causes a light amount of the light source at the time of detecting the sheet size to be less than a light amount of the light source at the time of the image reading, and performs a first process of causing a first gain of the amplification unit at the time of detecting the sheet size to be greater than a second gain of the amplification unit at the time of the image reading.

8 Claims, 7 Drawing Sheets

SCANNER TURNING ON LIGHT SOURCE DURING CLOSING PRESSURE PLATE AND SHEET SIZE DETECTION METHOD BY SCANNER

CROSS-REFERENCE TO RELATED APPLICATION

This application is based upon and claims the benefit of priority from Japanese Patent Application No. 2017-022729, filed Feb. 10, 2017, the entire contents of which are incorporated herein by reference.

FIELD

Embodiments described herein relate generally to a control technology for a light source at the time of detecting a sheet size.

BACKGROUND

When scanners mounted on multi-function peripherals (MFPs) are used, sheets are first set on original document stands (platens) in a state in which pressure plates (platen covers) are opened. Subsequently, the pressure plates are closed, but the scanners detect the widths of original documents by turning on light sources used to read original documents and located below the original document stands during closing the pressure plates. Simultaneously, the scanners detect the lengths of sheets by photo sensors. In the state in which the pressure plates are closed, the scanners scan the light sources used to read original documents in the longitudinal direction of sheets and guide reflected light up to CCDs. Then, the scanners capture images on the sheets by the CCDs.

In such scanners of the related art, there is a problem that light sources turned on during closing the pressure plates are dazzled.

DETAILED DESCRIPTION

In general, according to one embodiment, a scanner includes an original document stand, a pressure plate, a carriage, an image sensor, an amplification unit, and a processor. A sheet is placed on the original document stand. The pressure plate is opened and closed with respect to the original document stand and presses down the sheet in a closed state. The carriage scans the sheet on the original document stand with light by a light source while moving in a first direction at the time of image reading and reflects reflected light from the sheet. The image sensor receives the reflected light from the carriage. The amplification unit amplifies an output signal of the image sensor. The processor turns on the light source during closing the pressure plate, detects a sheet size in a second direction perpendicular to the first direction, causes a light amount of the light source at the time of detecting the sheet size to be less than a light amount of the light source at the time of the image reading, and performs at least one of a first process of causing a first gain of the amplification unit at the time of detecting the sheet size to be greater than a second gain of the amplification unit at the time of the image reading and a second process of causing a first light accumulation time of the image sensor at the time of detecting the sheet size to be greater than a second light accumulation time at the time of the image reading.

In general, according to one embodiment, a sheet size detection method is a detection method by a scanner including an original document stand on which a sheet is placed, a pressure plate that is opened and closed with respect to the original document stand and presses down the sheet in a closed state, a carriage that scans the sheet on the original document stand with light by a light source while moving in a first direction at the time of image reading and reflects reflected light from the sheet, an image sensor that receives the reflected light from the carriage, and an amplification unit that amplifies an output signal of the image sensor. In the sheet size detection method, the light source is turned on during closing the pressure plate, a sheet size is detected in a second direction perpendicular to the first direction, a light amount of the light source at the time of detecting the sheet size is caused to be less than a light amount of the light source at the time of the image reading, and at least one of a first process of causing a first gain of the amplification unit at the time of detecting the sheet size to be greater than a second gain of the amplification unit at the time of the image reading and a second process of causing a first light accumulation time of the image sensor at the time of detecting the sheet size to be greater than a second light accumulation time at the time of the image reading is performed.

Figure 1:
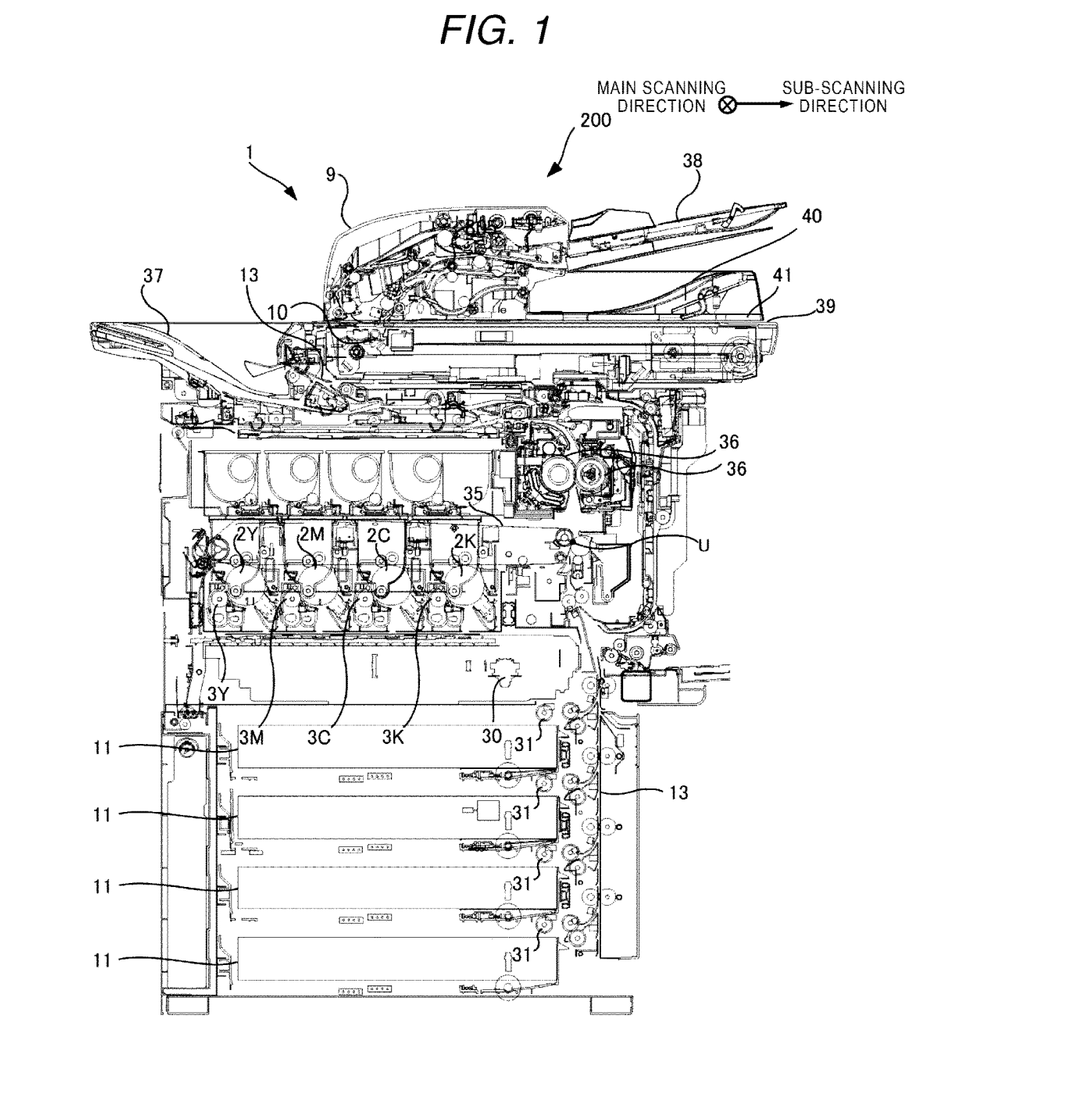
FIG. 1 is a diagram illustrating the configuration of an image forming apparatus.

Hereinafter, embodiments will be described with reference to the drawings. FIG. 1 is a diagram illustrating the configuration of an image forming apparatus 200. The image forming apparatus 200 is a multi-function peripheral (MFP) that has a plurality of functions such as copy, printing, scanning, FAX, and Email transmission.

In the image forming apparatus 200, an image of a sheet on an original document tray 38 or an original document stand 39 is read by a scanner 1. The image forming apparatus 200 includes a cassette 11. A recording medium is placed on the cassette 11. A recording medium is, for example, a sheet, an envelope, or an OHP recording medium. In the image forming apparatus 200, a recording medium is picked up from the cassette 11 by a pickup roller 31 and the recording medium is transported to a transport path 13. The transport path 13 is a path which extends from the side of the cassette 11 to the side of a discharge tray 37 and through which a recording medium is transported.

In the image forming apparatus 200, the recording medium picked up from the cassette 11 is transported to a secondary transfer position U by a transport roller or a resist roller. In the image forming apparatus 200, electrostatic latent images are formed on photoconductive drums 2Y to 2K (2Y, 2M, 2C, and 2K: the same applies to other reference numerals) by a laser optical system 30 based on image data of a sheet. In the image forming apparatus 200, developers 3Y to 3K are driven to develop the electrostatic latent images on the photoconductive drums 2Y to 2K with toner of Y to K and toner images of Y to K are formed on the photoconductive drums 2Y to 2K.

In the image forming apparatus 200, the toner images of Y to K on the photoconductive drums 2Y to 2K are transferred onto a transfer belt 35 in a superimposition manner in the order of Y, M, C, and K to form one color toner image on the transfer belt 35. In the image forming apparatus 200, the toner images on the transfer belt 35 are transferred to a recording medium at the secondary transfer position U. In the image forming apparatus 200, the sheet is heated by a fixing unit 36 and the toner images are fixed onto the sheet, and subsequently the sheet is discharged to the discharge tray 37.

Figure 2:
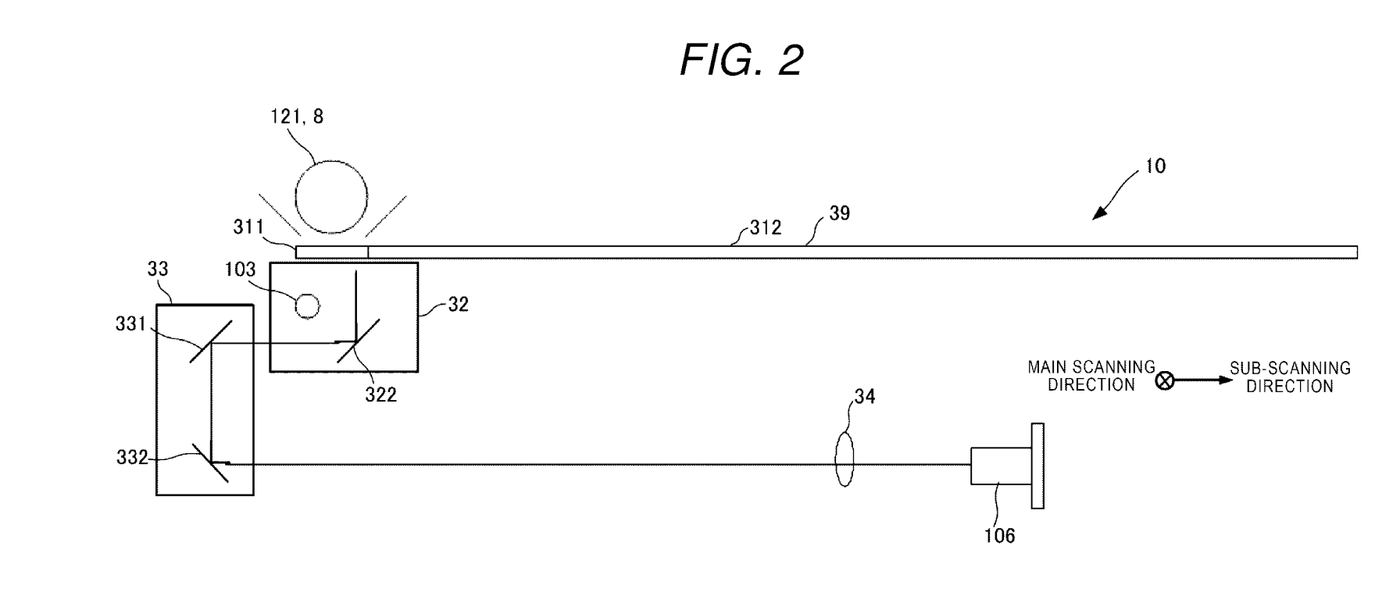
FIG. 2 is a diagram illustrating the configuration of a scanner.

FIG. 2 is a diagram illustrating the configuration of the scanner 1. The scanner 1 includes an auto document feeder (ADF) 9 and a scanning optical system 10. The ADF 9 includes an original document tray 38, a discharge tray 40 (see FIG. 1), a document feeder 121, and a pressure plate 41. The ADF 9 sends the sheet on the original document tray 38 to the discharge tray 40 after passing through the document feeder 121. The document feeder 121 passes the sheet to a through-read glass 311 while facing the sheet to the through-read glass 311 to be described below. In the document feeder 121, a portion facing the through-read glass 311 is white and functions as a background of the through-read glass 311.

The pressure plate 41 is a lower end portion of the ADF 9, is opened and closed with respect to the original document stand 39, and presses down the sheet against the original document stand 39 in the closed state. A surface of the pressure plate 41 facing an original document stand glass 312 is white and the pressure plate 41 functions as a background of the original document stand glass 312. The scanning optical system 10 includes the original document stand 39, a first carriage 32, a second carriage 33, a lens 34, and a charge coupled device image sensor (CCD) 106. The original document stand 39 includes the through-read glass 311 and the original document stand glass 312. The through-read glass 311 is located below the document feeder 121. The original document stand glass 312 supports the sheet at a different position from the through-read glass 311 in a sub-scanning direction (first direction).

The sub-scanning direction is a movement direction of the first carriage 32 and the second carriage 33 and indicates the horizontal direction in FIG. 2. A main scanning direction (second direction) is a direction perpendicular to the sub-scanning direction and indicates the vertical direction to the paper surface of FIG. 2. The first carriage 32 is located below the original document stand 39 and includes a light source 103 and a first mirror 322. A home position of the first carriage 32 is located below the through-read glass 311. At the time of image reading, the first carriage 32 is moved in the sub-scanning direction from the home position to a side separated from the original document stand glass 312.

The light source 103 extends in the vertical direction to the paper surface of FIG. 2 and irradiates the sheet with light via the through-read glass 311 or the original document stand glass 312. For example, a xenon lamp or an LED can be adopted as the light source 103. The first mirror 322 reflects reflected light from the sheet toward a second mirror 331 to be described below. The second carriage 33 is located below the original document stand 39 and includes the second mirror 331 and a third mirror 332. The home position of the second carriage 33 is located below the through-read glass 311. At the time of the image reading, the second carriage 33 is moved in the sub-scanning direction from the home position to a side separated from the original document stand glass 312. The second carriage 33 is moved in the sub-scanning direction at half of a speed of the first carriage 32. Thus, light path lengths among the sheet, the first mirror 322, the second mirror 331, the third mirror 332, and the CCD 106 are constantly maintained. The second mirror 331 and the third mirror 332 reflect reflected light from the first mirror 322 toward the CCD 106.

Figure 3:
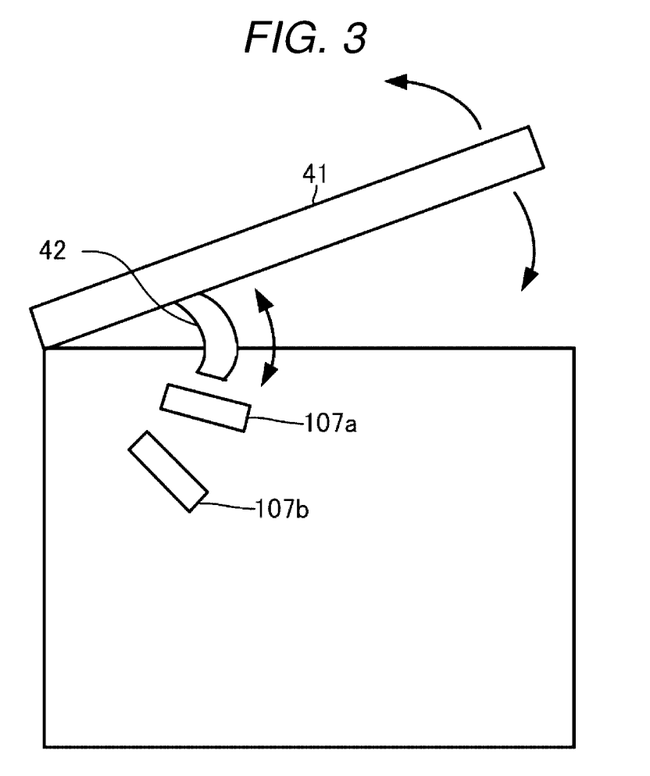
FIG. 3 is a diagram illustrating a configuration in which an operation of opening or closing a pressure plate is detected.

FIG. 3 is a diagram illustrating a configuration in which an operation of opening or closing a pressure plate is detected. A pressure plate opening and closing plate 42 is provided near the opening and closing center of the pressure plate 41. The pressure plate opening and closing plate 42 is moved according to an operation of opening or closing the pressure plate 41. A pressure plate opening or closing detection sensor 107 includes pressure plate opening or closing detection sensors 107a and 107b. The pressure plate opening or closing detection sensor 107a detects movement of the pressure plate opening and closing plate 42 during the operation of closing the pressure plate 41. The pressure plate opening or closing detection sensor 107b detects movement of the pressure plate opening and closing plate 42 immediately before the pressure plate 41 is closed. Thus, the pressure plate opening or closing detection sensor 107 detects two stages during and immediately before the operation of closing the pressure plate 41.

Figure 4:
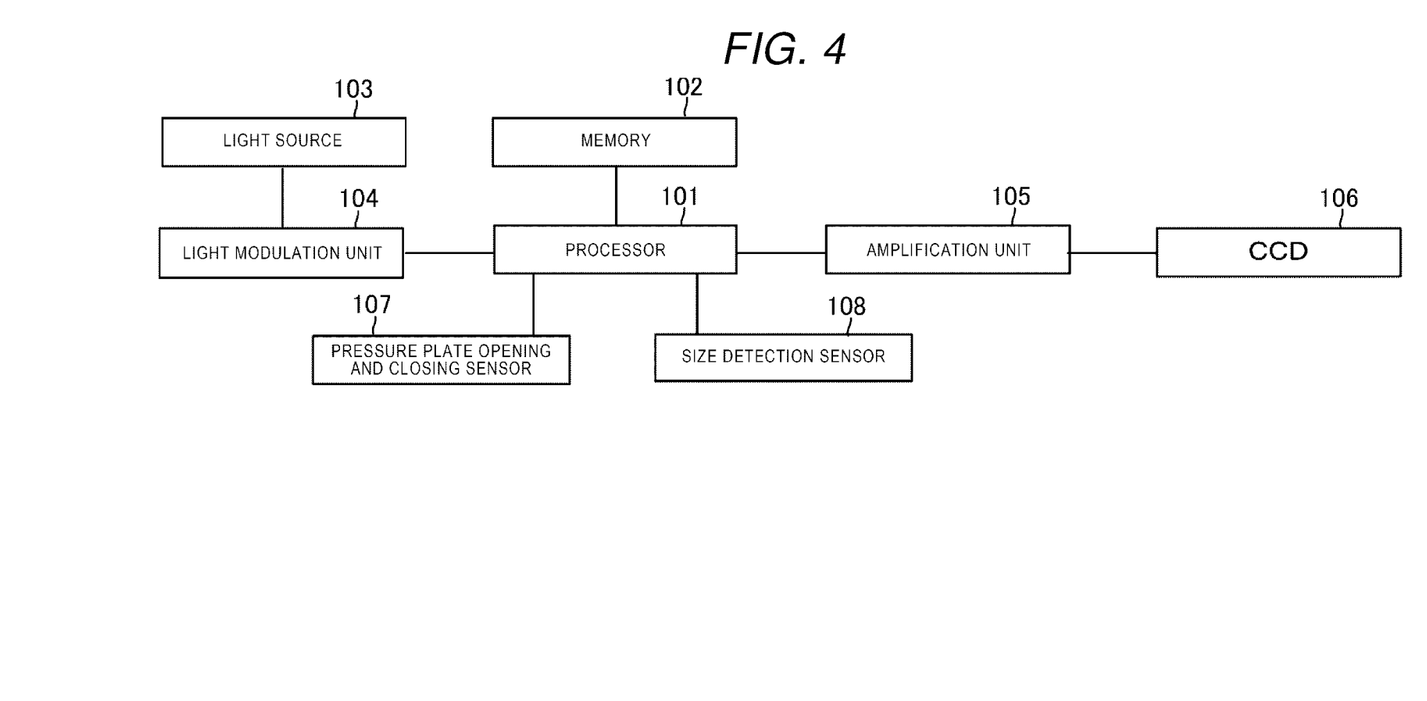
FIG. 4 is a block diagram illustrating the scanner.

FIG. 4 is a block diagram illustrating a circuit configuration of the scanner 1. The scanner 1 includes the light source 103, a light modulation unit 104, the CCD 106, an amplification unit 105, the pressure plate opening or closing detection sensor 107, a size detection sensor 108, a memory 102, and a processor 101 as a circuit configuration. The memory 102 stores light amount setting of the light source 103 at the time of detecting a sheet size. The memory 102 stores setting of at least one of a gain of the amplification unit 105 at the time of detecting the sheet size and a light accumulation time of the CCD 106 at the time of detecting the sheet size. The pressure plate opening or closing detection sensor 107 detects two stages during and immediately before an operation of closing the pressure plate 41. The processor 101 reads a signal during closing the pressure plate 41 of the pressure plate opening or closing detection sensor 107 and a signal immediately before the pressure plate 41 is closed and detects that the pressure plate 41 is being closed. When the processor 101 detects that the pressure plate 41 is being closed, the processor 101 reads the light amount setting of the light source at the time of detecting the sheet size from the memory 102. Also, the processor 101 reads a light accumulation time or a gain of the amplification unit 105 at the time of detecting the sheet size from the memory 102. The processor 101 drives the light modulation unit 104 using the light amount setting at the time of detecting the sheet size read from the memory 102 and turns on the light source 103. Here, the light amount at the time of detecting the sheet size is less than a light amount at the time of normal image reading.

Figure 5:
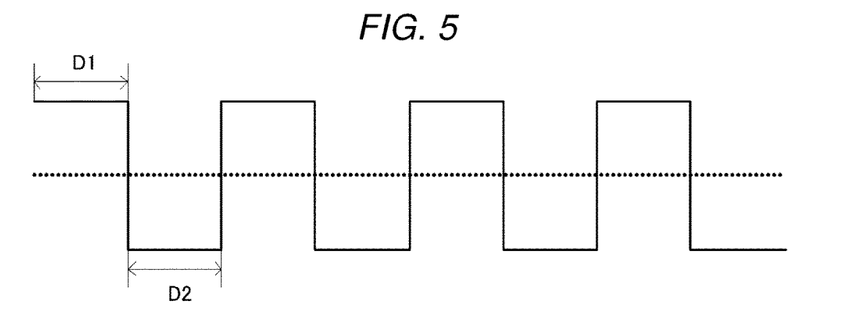
FIG. 5 is a diagram illustrating PWM control.
Figure 6:
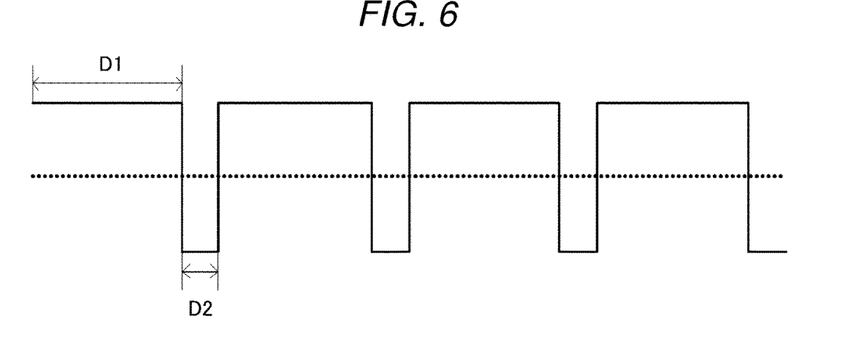
FIG. 6 is a diagram illustrating an example of the PWM control at the time of image reading.
Figure 7:
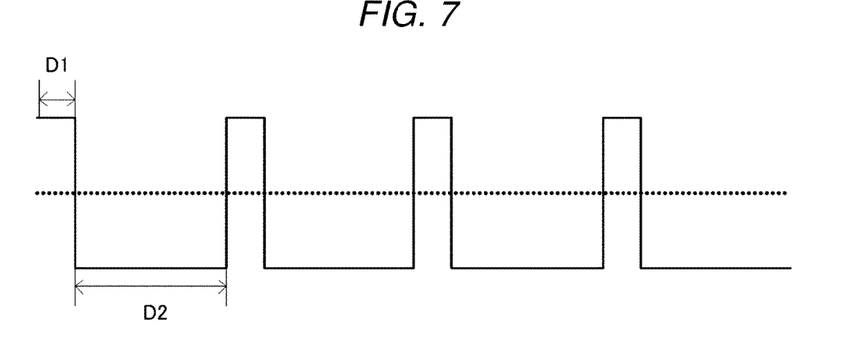
FIG. 7 is a diagram illustrating the PWM control at the time of detecting a sheet size.

A light amount of the light source 103 is adjusted through pulse width modulation light control (hereinafter referred to as PWM control). In this case, the processor 101 causes a duty ratio in the PWM control at the time of detecting the sheet size to be less than a duty ratio at the time of the image reading. FIG. 5 is a diagram illustrating the PWM control. When an operation is performed at a designated frequency, the light source 103 is repeatedly turned on and off during D1 and D2, respectively. FIG. 6 is a diagram illustrating an example of the PWM control at the time of image reading. FIG. 7 is a diagram illustrating an example of the PWM control at the time of detecting the sheet size. The frequency is assumed to be the same in FIGS. 6 and 7. A light emission time D1 of the light source at the time of detecting the sheet size is a time which is ¼ of a light emission time of the light source 103 at the time of reading a sheet. Thus, the light amount at the time of detecting the sheet size is reduced to reduce dazzling felt by a user.

The processor 101 may increase an output of the light source 103 at the time of detecting the sheet size based on the life span of the light source 103. For example, when 1000 hours elapses as a use time of the light source 103 and the light source 103 deteriorates, the processor 101 increases the light amount setting, for example, from ⅓ to ½.

When only the light amount of the light source 103 is simply reduced, an output of the CCD 106 necessary to detect the sheet size may not be obtained due to lowering of the output of a read signal. Thus, the processor 101 drives the amplification unit 105 using a gain (first gain) at the time of detecting the sheet size greater than a gain (second gain) at the time of the image reading (a first process).

Alternatively, the processor 101 drives the CCD 106 using a first light accumulation time of the CCD 106 at the time of detecting the sheet size greater than a second light accumulation time at the time of the image reading (a second process). By lengthening the light accumulation time of the CCD 106, it is possible to obtain a necessary CCD output. Thus, it is possible to detect a correct sheet size. In the scanner 1 mounted on the image forming apparatus 200 which is a medium-speed apparatus, a CCD output of about 750 mV is output when the light accumulation time is 169.3 μsec. For example, when the light amount at the time of detecting the sheet size is reduced to ¼ times, the light accumulation time is changed to 4 times (677.2 μsec) so that a CCD output of 750 mV can be ensured. Similarly, when the light amount is set to ½ times, the light accumulation time can be doubled so that a necessary CCD output can be ensured. Thus, it is possible to ensure a level of a CCD output signal when the light amount at the time of detecting the sheet size is reduced.

The processor 101 may perform at least one of the first and second processes or may perform both the first and second processes. The processor 101 may cause a ratio of the first light accumulation time to the second light accumulation time to be greater than a ratio of the first gain to the second gain.

The processor 101 detects the size of the sheet in a sheet width direction (the main scanning direction) when the CCD 106 reads light emitted by turning on the light source 103 and reflected from the sheet on the original document stand glass 312. The processor 101 detects a size in a sheet length direction (the sub-scanning direction) using the size detection sensor 108. The processor 101 settles the sheet size from the output of the CCD 106 and the output of the size detection sensor 108.

Figure 8:
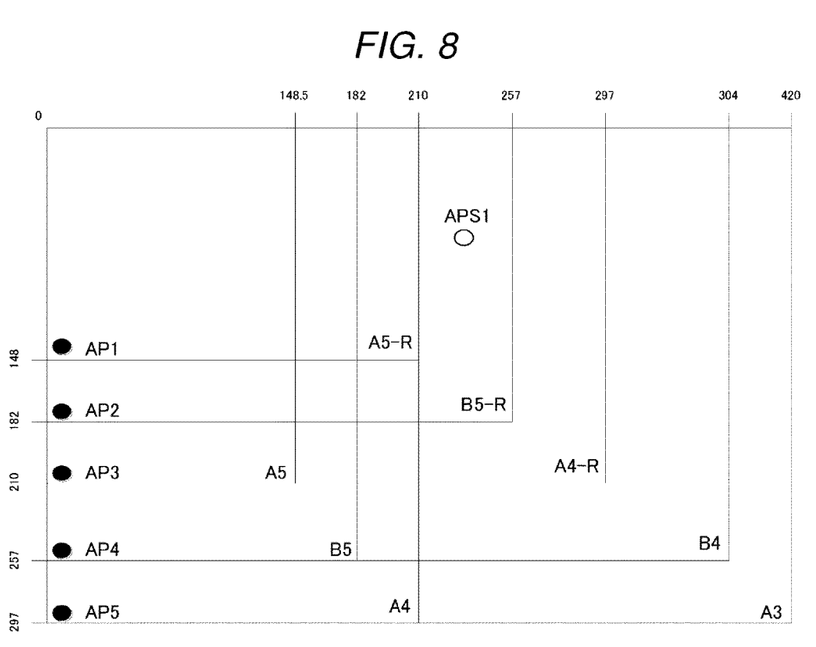
FIG. 8 is a diagram illustrating a size detection position of a sheet.

FIG. 8 is a diagram illustrating a size detection position of a sheet. Here, a case in which A-series (A3, A4, A5, B4, and B5) sheet sizes are detected will be described as an example. The CCD 106 detects a sheet size in the sheet width direction (the main scanning direction). AP1 to AP5 illustrated in FIG. 8 are size detection points. The processor 101 calculates a CCD output average value of each detection point in an open state of the pressure plate 41 and stores the CCD output average value in the memory 102. Next, the processor 101 calculates an average value of each detection point in a closed state of the pressure plate 41 and stores the average value in the memory 102. The processor 101 compares the average values of each detection point in the open state and the closed state and determines that there is no sheet at that location when a difference between the average values is large. Conversely, the processor 101 determines that there is a sheet in that location when the difference between the average values is small. Thus, the processor 101 detects the size in the sheet width direction. It is assumed that a threshold for the determination can be set arbitrarily.

Next, the size detection sensor 108 detects a sheet size in the sheet length direction (the sub-scanning direction). A reflective photosensor can be adopted as the size detection sensor 108. APS1 illustrated in FIG. 8 is a size detection point. For example, for A4-R and A5, the sheet size may not be settled in detection in only the sheet width direction. Accordingly, the processor 101 detects a detection result of a sheet size detection sensor of APS1 together as a size. The processor 101 stores an output of APS1 in the open state of the pressure plate 41 in the memory 102. The processor 101 settles the sheet size from outputs of AP1 to AP5 and the output of APS1.

Figure 9:
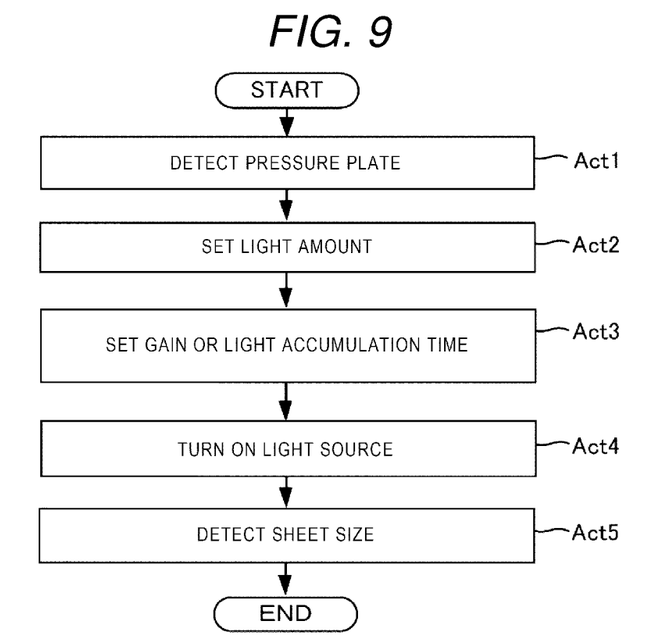
FIG. 9 is a flowchart illustrating a sheet size detection procedure by the scanner.

FIG. 9 is a flowchart illustrating a sheet size detection process by the scanner 1. A process program is stored in the memory 102 and is executed by the processor 101.

The processor 101 reads a signal during closing the pressure plate 41 and a signal in an immediately previous state of the pressure plate 41 using the pressure plate opening or closing detection sensor 107 and detects that the pressure plate 41 is being closed (Act 1).

When the processor 101 detects that the pressure plate 41 is being closed, the processor 101 reads the light amount setting of the light source 103 at the time of detecting the sheet size from the memory 102 (Act 2). Also, the processor 101 reads the setting of the light accumulation time or the gain of the amplification unit 105 at the time of detecting the sheet size from the memory 102 (Act 3).

The processor 101 drives the light modulation unit 104 using the setting of the light amount read from the memory 102 and turns on the light source 103 during closing the pressure plate 41 (Act 4). Here, the processor 101 reduces the light amount used to turn on the light source 103 at the time of detecting the size in the sheet width direction so that the light amount is less than the light amount at the time of normal sheet reading. When the processor 101 performs the PWM control, the processor 101 causes a duty ratio in the PWM control at the time of detecting the sheet size to be less than a duty ratio at the time of the image reading. The processor 101 may increase the output of the light source 103 at the time of detecting the sheet size based on the life span of the light source 103.

The processor 101 drives the CCD 106 to detect a sheet size (Act 5). At this time, the processor 101 drives the amplification unit 105 using the gain (the first gain) at the time of detecting the sheet size greater than the gain (the second gain) at the time of image reading (the first process). Alternatively, the processor 101 drives the CCD 106 using the first light accumulation time at the time of detecting the sheet size greater than the second light accumulation time at the time of the image reading (the second process). The processor 101 may perform at least one of the first and second processes or may perform both the first and second processes. The processor 101 may cause the ratio of the first light accumulation time to the second light accumulation time to be greater than the ratio of the first gain to the second gain. The processor 101 settles the sheet size from the output of the CCD 106 and the output of the size detection sensor 108. The foregoing steps are not limited to the foregoing procedure. The amplification unit 105 may be embedded in an image sensor such as a complementary metal oxide semiconductor (CMOS).

As described in detail above, according to the technology described in the present specification, it is possible to provide a control technology for a light source at the time of detecting the sheet size.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A scanner comprising
an original document stand on which a sheet is placed;
a pressure plate that is opened and closed with respect to the original document stand and presses down the sheet in a closed state;
a carriage that scans the sheet on the original document stand with light by a light source while moving in a first direction at the time of image reading and reflects reflected light from the sheet;
an image sensor that receives the reflected light from the carriage;
an amplification unit that amplifies an output signal of the image sensor; and
a processor that turns on the light source during closing the pressure plate, detects a sheet size in a second direction perpendicular to the first direction, causes a light amount of the light source at the time of detecting the sheet size to be less than a light amount of the light source at the time of the image reading, and performs at least one of:
a first process of causing a first gain of the amplification unit at the time of detecting the sheet size to be greater than a second gain of the amplification unit at the time of the image reading; and
a second process of:
causing a first light accumulation time of the image sensor at the time of detecting the sheet size to be greater than a second light accumulation time at the time of the image reading, and
causing a ratio of the first light accumulation time to the second light accumulation time to be greater than a ratio of the first gain to the second gain.

2. The scanner according to claim 1,
wherein the processor performs both the first and second processes.

3. The scanner according to claim 1,
wherein the processor increases the light amount of the light source at the time of detecting the sheet size based on a life span of the light source.

4. The scanner according to claim 1,
wherein the processor performs PWM control on the light source and causes a duty ratio in the PWM control at the time of detecting the sheet size to be less than a duty ratio at the time of the image reading.

5. A sheet size detection method by a scanner including an original document stand on which a sheet is placed, a pressure plate that is opened and closed with respect to the original document stand and presses down the sheet in a closed state, a carriage that scans the sheet on the original document stand with light by a light source while moving in a first direction at the time of image reading and reflects reflected light from the sheet, an image sensor that receives the reflected light from the carriage, and an amplification unit that amplifies an output signal of the image sensor, the method comprising:
causing a light amount of the light source at the time of detecting a sheet size to be less than a light amount of the light source at the time of image reading during closing the pressure plate and turning on the light source;
performing at least one of:
a first process of causing a first gain of the amplification unit at the time of detecting the sheet size to be greater than a second gain of the amplification unit at the time of the image reading; and
a second process of:
causing a first light accumulation time of the image sensor at the time of detecting the sheet size to be greater than a second light accumulation time at the time of the image reading, and
causing a ratio of the first light accumulation time to the second light accumulation time to be greater than a ratio of the first gain to the second gain; and
detecting a sheet size in a second direction perpendicular to the first direction.

6. The detection method according to claim 5,
wherein both the first and second processes are performed.

7. The detection method according to claim 5,
wherein the light amount of the light source at the time of detecting the sheet size is increased based on a life span of the light source.

8. The detection method according to claim 5,
wherein PWM control is performed on the light source and a duty ratio in the PWM control at the time of detecting the sheet size is caused to be less than a duty ratio at the time of the image reading.

* * * * *